July 13, 1937.  G. T. MARKEY  2,086,813
METHOD OF INCUBATING
Filed April 6, 1933  5 Sheets-Sheet 1

Inventor
GEORGE T. MARKEY,
By Toulmin & Toulmin
Attorneys

July 13, 1937.   G. T. MARKEY   2,086,813
METHOD OF INCUBATING
Filed April 6, 1933   5 Sheets-Sheet 2

GEORGE T. MARKEY,
By Toulmin & Toulmin
Attorneys

July 13, 1937.　　　G. T. MARKEY　　　2,086,813
METHOD OF INCUBATING
Filed April 6, 1933　　5 Sheets-Sheet 3

Inventor
GEORGE T. MARKEY,
By Toulmin & Toulmin
Attorneys

July 13, 1937.     G. T. MARKEY     2,086,813
METHOD OF INCUBATING
Filed April 6, 1933     5 Sheets-Sheet 4
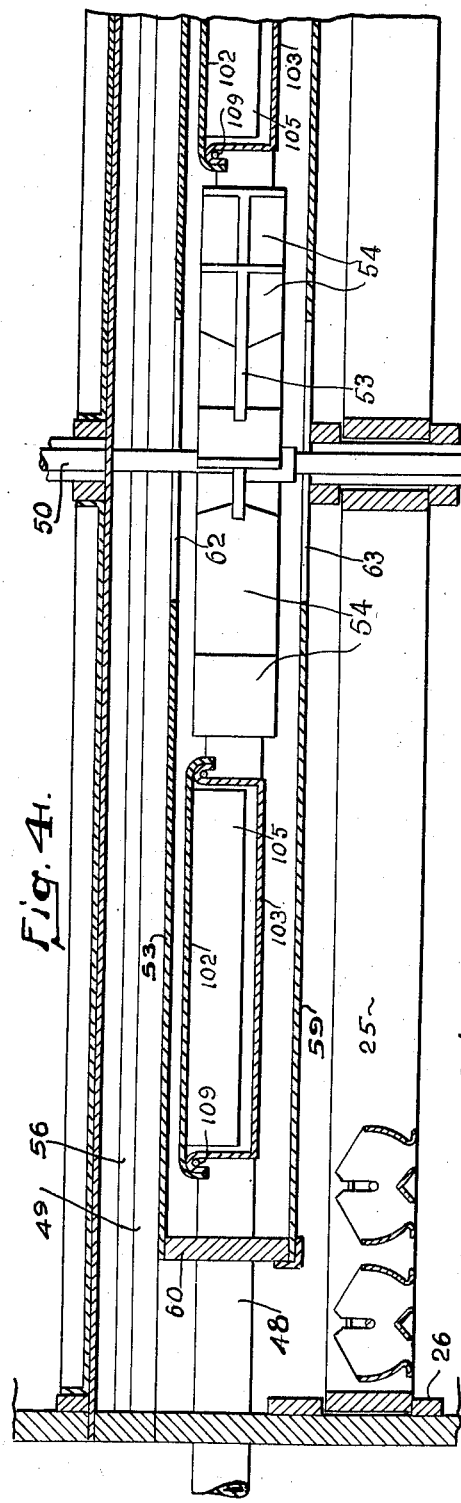
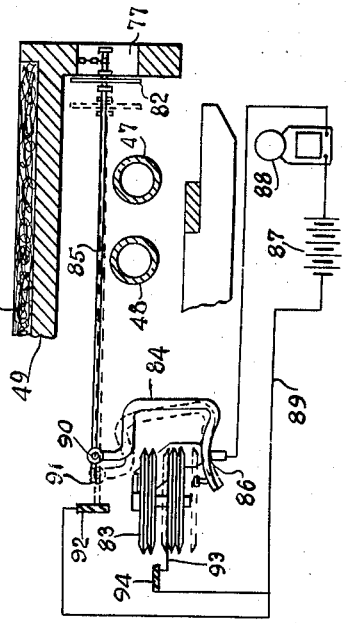
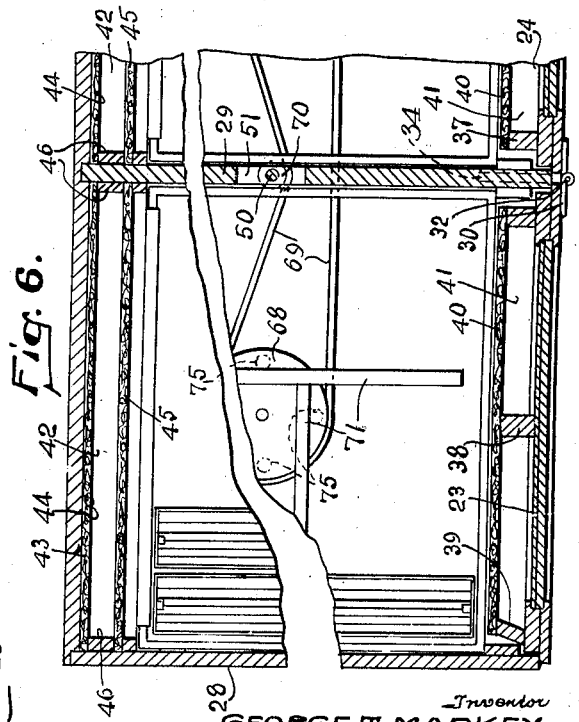
GEORGE T. MARKEY, Inventor
By Toulmin & Toulmin
Attorneys July 13, 1937.  G. T. MARKEY  2,086,813
METHOD OF INCUBATING
Filed April 6, 1937  5 Sheets-Sheet 5

Inventor
GEORGE T. MARKEY,
By Toulmin & Toulmin
Attorneys

Patented July 13, 1937

2,086,813

UNITED STATES PATENT OFFICE 2,086,813

METHOD OF INCUBATING

George T. Markey, Fort Atkinson, Wis., assignor to James Manufacturing Company, Fort Atkinson, Wis., a corporation of Wisconsin Application April 6, 1933, Serial No. 664,795

2 Claims. (Cl. 119—35)

This invention relates to improvements in heating systems for incubators of the general type in which power-driven means is employed to promote the agitation and stirring of air to heat it, and distributing the heat for the purpose of vitalizing the agitated air and for the purpose of proper ventilation.

It is especially an object of this invention to provide major heat-supplying means with auxiliary intermittently and independently operable heating means more sensitive to control than the major heating means, the latter being preferably designated to operate within a range below the maximum permissible temperature; to utilize the auxiliary heating means for operating a signal in case of extreme emergency; to provide for the distribution of air to all parts of the heat radiating surface in such a manner as to keep such surface and the air contacting therewith from becoming superheated and devitalized; to provide means for mixing and maintaining the air in a uniformly proper condition of temperature, humidity and purity, and to provide an incubator structure in which the aforesaid results may be accomplished with due regard to compactness and the maximum egg-receiving capacity in proportion to the size of the structure.

It is also an object of this invention to provide a method for incubating eggs, in which the eggs are arranged in staggered relationship with regard to the periods of incubation through which the eggs have passed, and in which the air is heated and delivered to the bottom of the cabinet below the egg trays and mixed at the bottom of the egg trays with incoming vitalized air and thoroughly mixed and caused to percolate up through the egg trays, where it is further agitated, stirred and vitalized for reagitating purposes.

It is my object to provide means for churning the air and, at the same time, causing a vacuum in the top of a stack of egg trays, delivering the churned air over humidifying means for controlling its humidity and reducing its temperature, restoring its temperature, introducing fresh air into the churned air, evacuating a portion of the air that has once passed over the eggs and returning the remainder of the air thus humidified, heated and churned to where it can be again churned, mixed and diffused, preferably in combination with incoming air, and then allowed to rise gently between diffusing supports of numerous eggs by convection and also due to the creating of a vacuum at the top of the eggs due to the churning of the air in a separated space above the eggs thereby avoiding drafts, hot and cold spots and forced circulation of air which would move the air so rapidly that it would be unable to suitably treat the eggs.

It is my object to avoid previous mistakes in the prior art of using forced draft machines in which large quantities of air are taken in and discharged every few minutes.

These and other advantages will appear from the following description taken in connection with the drawings.

This application is a continuation in part of my copending application, Ser. No. 282,302, filed June 2, 1928, which has become Patent No. 1,939,908, dated December 19, 1933.

Referring to the drawings:

Figure 4 is a fragmentary view in vertical section taken at right angles to that of Figure 2 substantially on line 4—4 of Figure 5.

Figure 6 is a section on the line 6—6 of Figure 2.

Figure 7 is a section on the line 7—7 of Figure 5.

Figure 1:
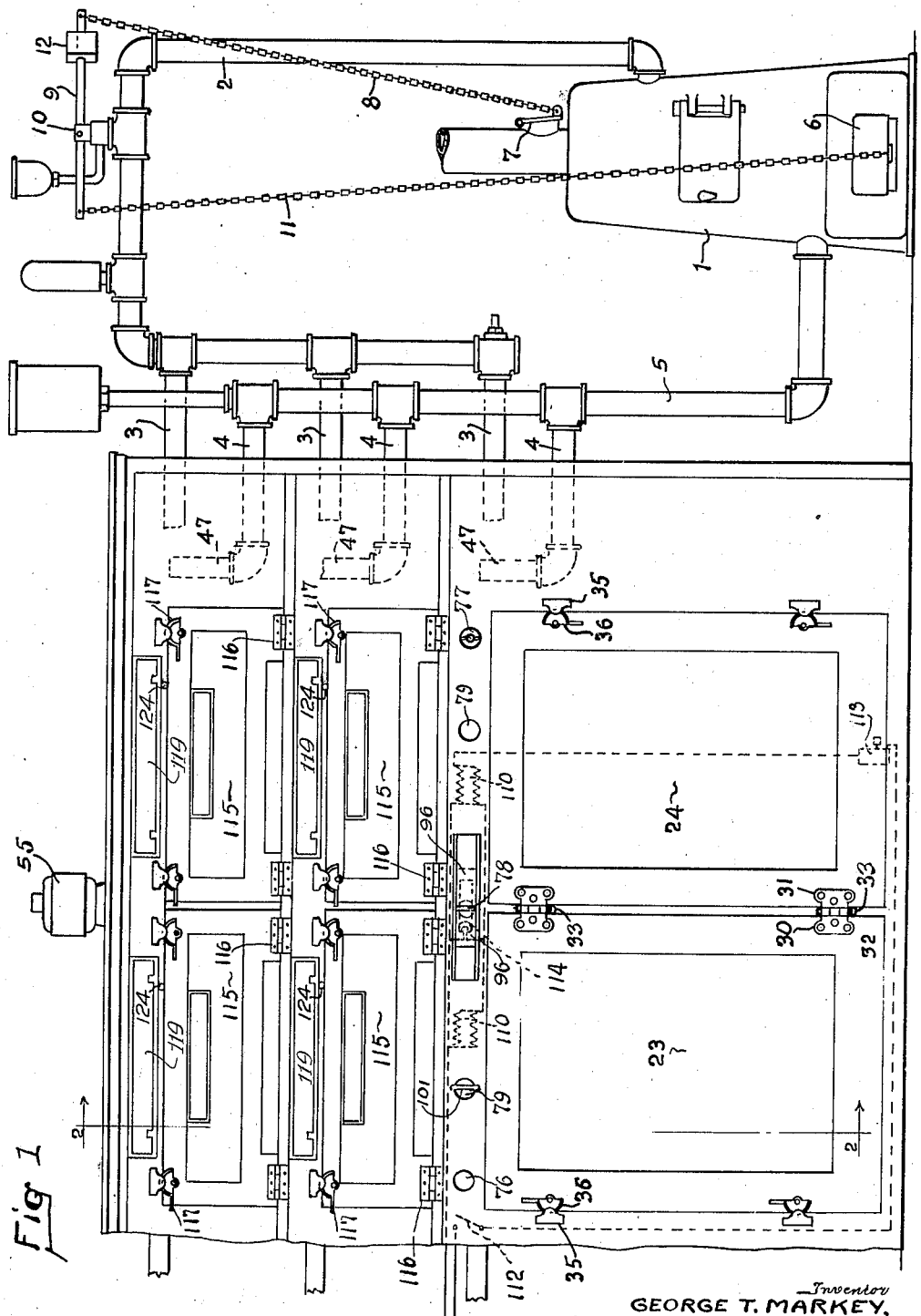
Figure 1 is a front elevation of an incubator unit embodying the invention herein claimed.

The heat for the incubator (Figure 1) is provided from a furnace 1, which has extending upwardly therefrom a hot water pipe 2 having a plurality of branches 3 extending into the various parts of the incubator and its sections. These branches are connected to the heater pipes 48. The return pipes 4 connected to the pipes 47 unite to form a return pipe 5, which enters the lower part of the furnace 1.

The furnace is provided with the usual damper 6 for controlling the draft. There is also provided in the stack or smoke flue a damper 7. Extending from the damper 7 upwardly is a chain 8 connected at its upper end to a lever 9 pivoted at the point 10 to some suitable support, such as the steam pipe 2. The damper 6 is connected to the other end of the lever 9 by means of a chain 11. On the lever 9 is a counterbalance weight 12.

Whenever the damper 6 is closed the damper 7 is open, and vice versa. The incubator herein described is adapted to be constructed in one or more units, which may be placed in a longitudinal series or any desired number of similar units connected with a common source or a source of heat and power. One source of heat is illustrated.

As shown in the drawings, each unit comprises one or more chambers, which for convenience in description will be designated as the incubating chambers and the hatching chambers. Access to the incubating chambers is had through doors 23 and 24. These incubating chambers are each designed to receive a considerable number of egg trays 25, one above the other in close proximity, and supported by means of rails 26.

The egg trays are described and claimed in Patent No. 1,796,872, issued March 17, 1931.

Figure 2:
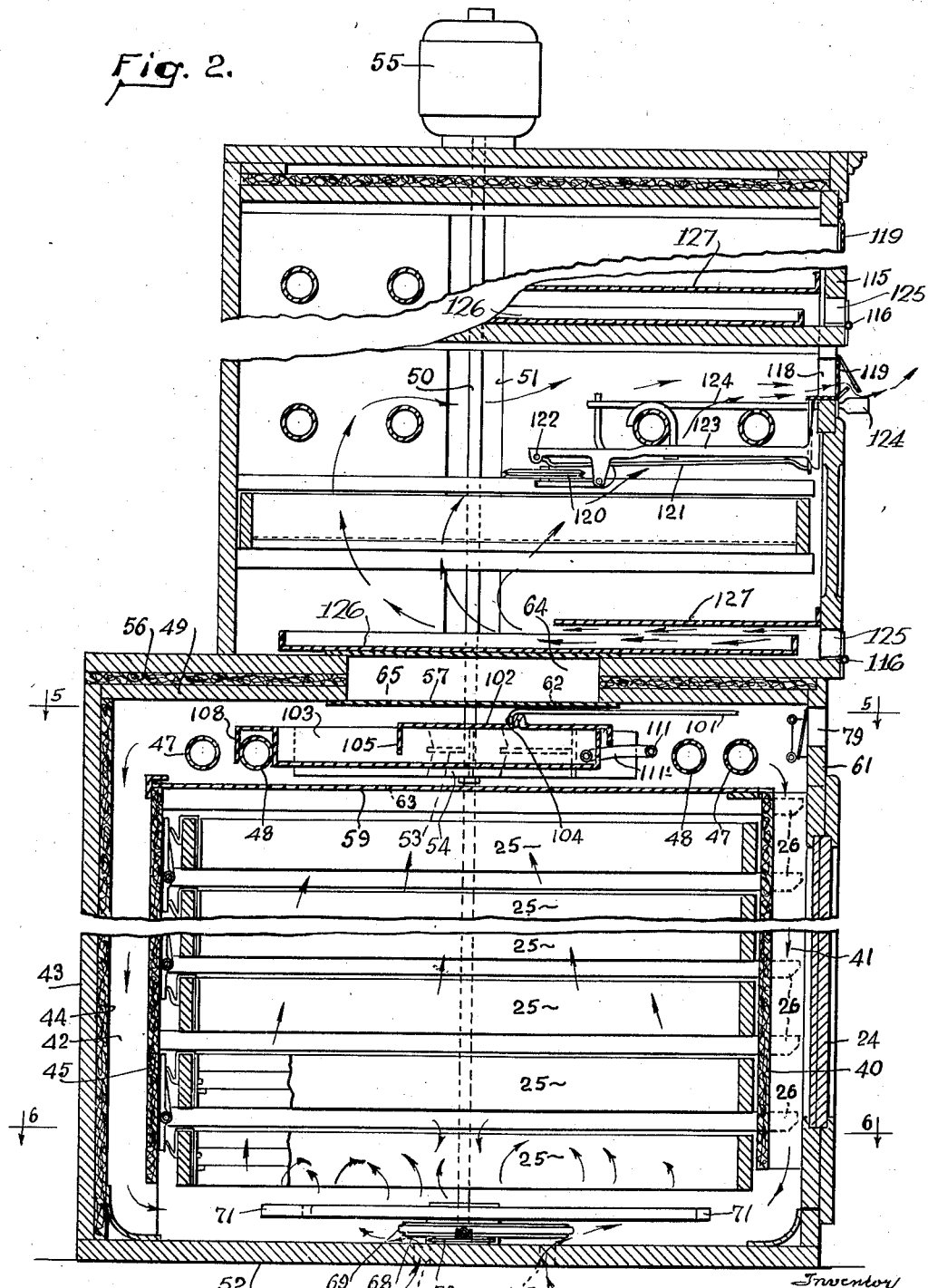
Figure 2 is a section on the line 2—2 of Figure 1.

The incubating casing (Figures 2, 3, and 5) is composed of side walls 27 and 28 and a partition 29 forming with the side walls two chambers. The doors are supported on the partition by means of hinges composed of leaves 30 and 31 connected by means of a pintle 32. Each pintle rests in the head 33 of a screw 34 extending into and supported by the partition. Each door is held closed by means of one or more latch members 35 located on the casing and engaged by a cooperating latch member 36 on the door.

At the hinge edge of each door is a vertical strip 37 and intermediate the vertical edges of each door is a center strip 38, while on the outer edge of the door is a vertical strip 39, which is beveled to engage a correspondingly formed part of the door jamb to cause a close fit between the door and the wall of the casing.

Attached to these strips 37, 38, and 39 is an inner wall 40, which forms with the vertical strips and the front wall of the door a vertical passageway or passageways 41 for the passage of air from the top of the incubating chamber to the bottom thereof. The rear wall of the casing 43 is provided with a rear wall lining 44, which has spaced therefrom an inner rear wall 45, spaced from the rear wall by means of two vertical strips 46. These walls and strips form a vertical passageway 42 at the rear of each chamber for the passage of air.

Extending through the upper part of the casing and above the incubating chamber are two sets of pipes, (Figures 3 and 5) one at the rear and one at the front of the casing. In each set of pipes is a pipe 48 connected to the pipe 3 for conducting the heating fluid into the casing. The other pipe 47 is connected to the return pipe 4 by which the used heating fluid is returned to the source of heat. These pipes are located in a heating chamber formed by the upper partition of the incubating chamber and the upper floor or wall of the incubator casing.

The top wall of the incubator casing is indicated by the numeral 49. For the purpose of stirring, agitating and aiding in the vitalization of air there is provided a vertical shaft 50, which extends through a slot 51 in the partition 29 and is supported in a bearing located in the bottom 52 of the casing. Suitably attached to this shaft in the heating chamber is a plate 53, and extending from this plate are arcuate wings 54 which extend above and below the plate so that air may be acted upon on both sides of the plate. The shaft is operated by means of a motor 55 located on top of the hatching chamber, or at any other suitable location.

Located on top of the member 49 is an insulating strip 56, (Figures 2 and 8) which has supported thereon a plate 58 forming really the outside part of the top of the incubator casing. 59 is the top of the incubating chamber and is immediately beneath the heating pipes 47 and 48. Extending transversely across the under side of the top 49 is a thin metal plate 57. Extending from the front to the rear, on opposite sides of the heating chamber, is a side wall 60 which extends from the front wall 61 to the rear wall. Above the center of each incubating chamber in the plate 57 is an air inlet opening 62, while there is a similar opening 63 in the top plate 59 of the incubator chamber. These two openings are in line with each other and on opposite sides of the plate 53, with its wings 54 thereon for agitating and stirring the air.

The action of the impeller stirrer 54 (Figures 3 and 8) results in creating a vacuum by the movement of the air through the opening 63. This provides an area of reduced pressure in the top portion of the egg chamber into which the air which is mixed with fresh air below the egg chamber gently flows.

Immediately above the plate 57 there is provided in the top 49 a cut-away part 65 which extends also into the part 58, as indicated by the numeral 64, to provide space for the circulation of air from the sides of the casing to the stirrer or agitator located in the heating chamber. On each side of the casing and extending down the walls thereof is an air space 66 connected at its upper end to the cut-out parts 64 and 65. Each side along the passageway 66 has insulating lining 67.

Figure 3:
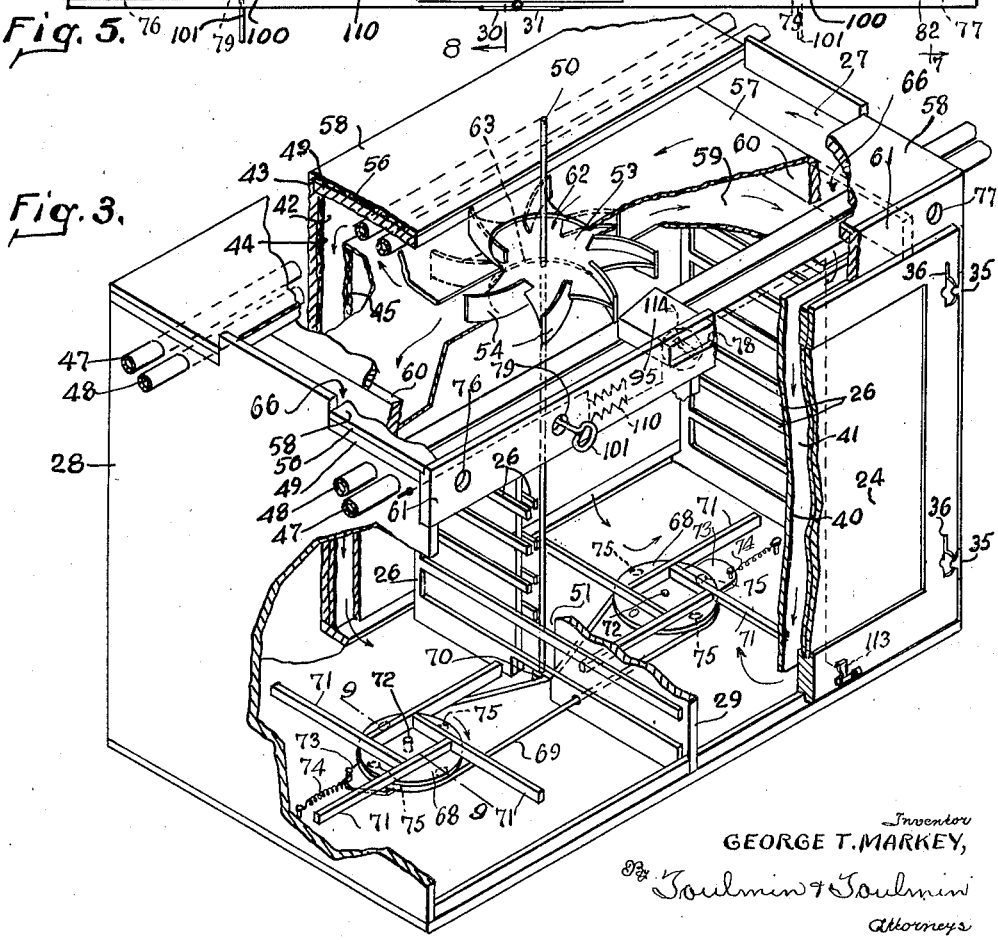
Figure 3 is an isometric view of the lower or incubator section with parts of the wall broken away to show the interior.

In the bottom of each incubating chamber, on the floor thereof, is a pulley 68 (Figure 3). Around the pulleys of the two adjacent chambers passes a belt 69 which engages a pulley 70 on the lower end of the motor shaft 50. Each pulley 68 has extending therefrom a plurality of arms 71, arranged at right angles to one another. Each pulley 68 is supported by means of a stud 72 mounted on a slide 73 supported on the base or bottom of the chamber. This slide is held and stabilized by means of a spring 74. The springs on the two slides tend to hold the two pulleys tense so they may be easily rotated by the rotation of the shaft 50.

Beneath each pulley 68, in the bottom of the cabinet, are ventilation openings 75, through which, by the action of the stirrer arms 71 fresh air is drawn into and mixed with the air in the casing. The amount of air entering through the openings 75 is too small to materially reduce the temperature. In the front part 61 of the casing is a small opening 76 which admits air into one of the passageways 66. Another small opening 77 admits air into the other passageway 66. The numeral 78 indicates a vent opening, while 79 indicates a normally closed opening.

The opening 76 is always open for the admission of a small amount of fresh air. The opening 77 is controlled by means of a thermostatically controlled valve 82, more completely shown in Figure 7. The thermostat 83 is suitably supported on some part of the incubator casing and is adapted to operate a yoke 84 pivoted at the point 86 and connected by means of a rod 85 to the valve 82. 87 is a battery which is connected to a bell 88 through a circuit 89. This circuit is made and broken by means of certain switch mechanism, to be described.

At one end of the rod 85 is a contact 91 at the point 90 where the rod 85 is pivoted to the yoke 84. This contact 91 is adapted to engage a second contact 92 for closing the circuit through the battery and the bell for giving a proper sound signal.

There is also provided on the thermostat a contact terminal 93 which is adapted to engage with a contact 94 for closing another circuit for giving a signal. When contact is made between the contacts 91 and 92 the bell indicates too great a temperature, and when the contact is made between the contacts 93 and 94 the ringing of the bell is caused by too great a fall in the temperature of the casing.

Figure 5:
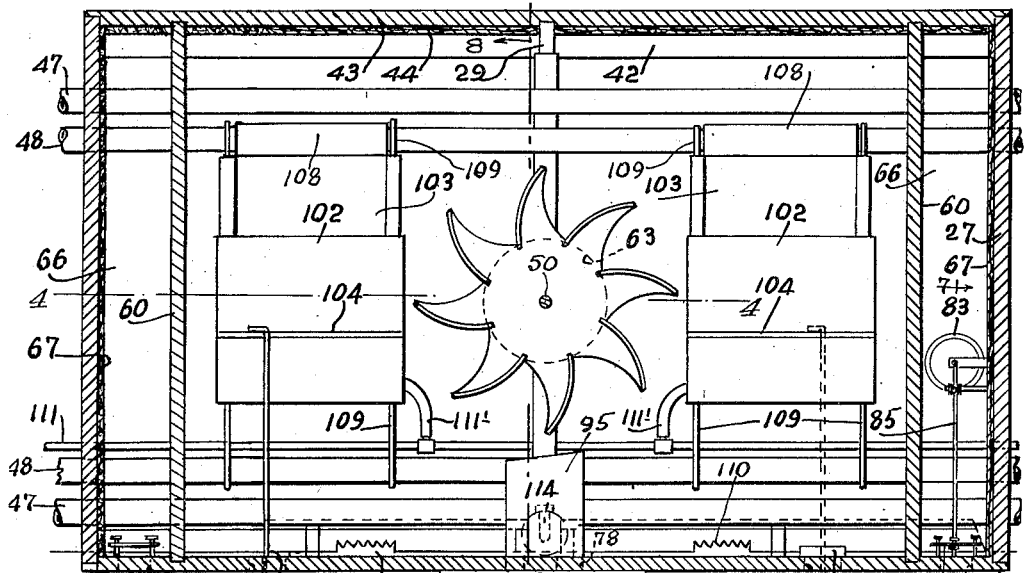
Figure 5 is a section on the line 5—5 of Figure 2.

Extending inwardly from the vent opening 78 is a chute-like passageway 95 which extends substantially to the periphery of the stirrer during rotation, as is clearly shown in Figure 5. This passageway extends across and above the pipes 47 and 48 at the front side of the incubator casing so that the operation of the stirrer will cause some of the air to pass out through the vent opening without taking any of the heat from the heating pipes. This passageway 78 may be closed by means of a pair of slide doors 96.

There are two openings 79 in the front wall member 61 and these are normally closed by hinged lids 100, which may be pushed to open position by a hook rod 101 (Figures 3 and 5) when such rod is inserted to adjust a cover 102 upon a water containing humidifier pan 103. The cover has an upwardly projecting flange 104 which may be engaged by the hook rod to shift the cover to its proper position. The cover 102 has a downwardly projecting flanges 105 (Figures 2 and 4) to prevent the escape of vapor from beneath it, and the humidifying capacity of the humidifier pan will therefore be determined by the uncovered area.

The pans 103 are supported by rods 109 and their rear walls have hooked flanges 108 that engage either one of the heating pipes to prevent the pans from shifting in position when their covers are being adjusted. Water is supplied to the pans from a source of constant level through a pipe 111 and a hose connection 111'.

The auxiliary heaters and heat controlling devices will now be described. A set of electric heaters 110 is located in the space between the front wall member 61 and the adjacent heating pipes 47, at which point they will be in the path of the air, which is driven toward the door passages 41. These heaters are connected in parallel in a circuit, which is preferably independent of that controlled by the air inlet thermostat, and are manually controlled by a switch 112.

The heating circuit is also automatically controlled by an electric thermostat 113, shown in Figure 1. This thermostat is located near the bottom of the incubating unit, where it will be responsive to the temperature of air which is about to trickle up through the egg trays. When the manually operated switch 112 is closed the thermostat 113 will function to control the heaters 110 within narrower limits of maximum and minimum temperature than is possible to be obtained by any control of the major heating system.

A lamp 114 is located in the circuit of the heaters 110 and is preferably located in the passageway 95 where it can be viewed through the vent opening 78. This lamp will indicate to an inspector whether the heaters are functioning. It will, of course, be understood that the heater for the major heating system will be controlled in an ordinary manner.

The hatching portion is located above the incubator portion, and consists of a series of superimposed hatching chambers each having a door 115 supported by means of hinges 116 and provided with a latch 117. Gravity ventilation is maintained through the thermostatically controlled shutter or damper 119 controlling a hole 118, which allows air to pass out of the chamber. Air is admitted through the slot 125 in the lower portion of the front wall and is directed across the humidifying pan 126, underneath a horizontal baffle wall 127, which extends inwardly from the front wall, to a point near the transverse center line of the humidifying pan. The thermostat is indicated by the numeral 120 and operates upon a lever 121 pivoted at the point 122 on an arm 123 supported on some part of the hatching casing. There is also provided a hand operated rod 124 for adjusting the heat control which extends through the front wall of the hatching chamber.

In the operation of the incubator the air is discharged outwardly from the ends of the stirrer blades 54 and passes downwardly through the wall and door passages into the bottom of the incubator, as shown by the arrows in Figure 3, where it is further agitated by the stirrer blades 71 and mixed with fresh air entering through the small holes 75 in the floor beneath the pulley 68. The air thus mixed is caused to trickle up through the stacks of egg trays arranged in the chambers located within the casing by the suction thus created at the hub of the stirrer blades 54. The construction of the casing and the arrangement of the operating parts therein are such that the air in all parts of the casing is maintained in a live, active and vitalized condition, and heated during its circulation by the spaced heating units 110.

The air passages in the front doors and rear walls form areas always occupied by warm air which act as insulating blankets on the sides of the column of egg trays to protect the eggs from cold air and to thereby prevent cold air impeding the convection flow within the egg chamber.

In my invention I place the hottest eggs, that is, those that are hatching, during the last three days of the delivery of the chick from the egg in separate independent compartments from the compartments where the incubation is performed during the first eighteen days.

In the incubation compartments I arrange the eggs in an interspersed order; that is, I practice staggered incubation. I do not arrange the eggs with the hottest eggs always on the bottom, as has been customary in some types of the prior art, but to the contrary, always so arrange the eggs that they are sandwiched by having the cold and warmer eggs interleaved or intermingled. I prefer in this arrangement to start placing the eggs at the top of the incubator, adding fresh eggs therebeneath, tray by tray, or in every other tray interleaving other eggs at a later date therewith. I do not move my egg trays after once having placed them in position.

Figure 8:
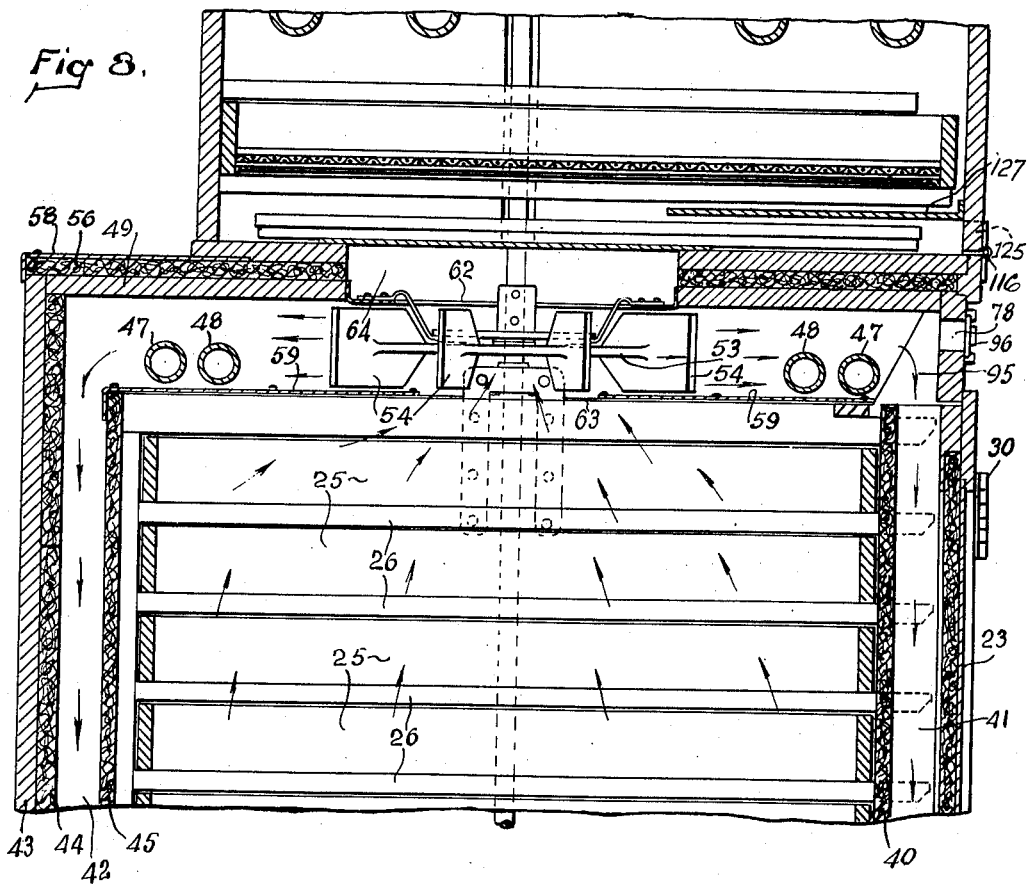
Figure 8 is an enlarged transverse section through the incubator showing the air exit opening at the top of the egg chamber.
Figure 9:
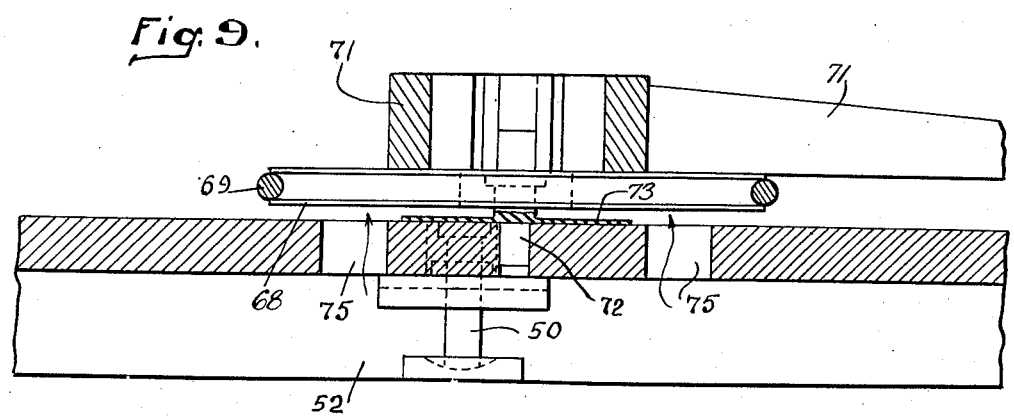
Figure 9 is a vertical section on the line 9—9 of Figure 3, looking toward the right, and showing the fresh air inlet openings beneath the lower stirrer.

During the first seventeen days of incubation, the eggs will be kept in one of the incubating chambers comprising the lower section of the unit. Each egg tray may be marked for identification and a record kept of the time of its insertion in the incubating chamber so that no attention need be paid to its position in that chamber, the temperature being constant and uniform in all portions thereof. At the end of the seventeen-day period the tray will be removed from the incubating section and placed in one of the superposed hatching chambers, where it will remain until the chicks have hatched. No nursery tray will be required and the hatching chambers will be made of such size as to receive and support the trays taken from the incubating section, all trays being exactly alike; and provided with egg tilting mechanism which may be applied to either the front or rear wall of the tray as set forth in the companion application which has become Patent Number 1,796,872 issued March 17, 1931. Connections for operating such egg turning mechanism are shown at the left-hand of the two lower trays shown partly in section in Figure 2. If desired the eggs may be transferred from the trays in the lower chamber to a conventional hatching tray such as shown in Figure 8.

It has been found in practice that during the first seventeen days of incubation it will be advantageous to provide uniform and constant conditions of heat, moisture and air circulation, the requirement for ventilation being considerably below that required by the eggs during the last few days of incubation, which has herein been termed the hatching period. During the first seventeen days the admission of fresh air is largely a matter of maintaining the oxygen supply, although it is desirable to change the supply to a sufficient extent to prevent the air from becoming extremely foul. The expelled air and other gases not only permit a certain degree of purification, but also provide space into which the fresh air may be drawn. During the hatching period continuous ventilation is desirable, but gravity circulation is prefered to the rapidly moving air in the system of the incubating section. Rapidly moving air absorbs more moisture from the shells of the eggs than slowly moving currents, and the rapidly moving currents would also tend to chill the newly hatched chickens by promoting rapid evaporation. It has been found that separate hatching chambers better serve the exacting requirements for proper ventilation, humidification and absence from drafts during the hatching period, and also facilitate a segregation of the chicks from one egg tray from those hatching in another, each hatching chamber being arranged to receive one tray.

It will be understood that I desire to comprehend within my invention such modifications as come within the scope of my claims and my invention.

Having thus fully described my invention, what I claim as new and desire to secure by Letters Patent, is:

1. A method of incubating eggs which consists in arranging eggs in a stack of layers, removing air from the top of the stack, heating, agitating and humidifying the removed air, and then moving this air downwardly along at least two sides of the stack without letting it come in contact with the eggs thereof, then introducing fresh air below the stack into the heated and humidified air, independently thoroughly mixing the fresh air and heated air, and causing the mixture to gently move up through the layers of eggs.

2. A method of incubating eggs which consists in arranging eggs in a stack of layers, removing air from the top of the stack, agitating and conditioning the removed air, and then moving this air downwardly along at least two sides of the stack without letting it come in contact with the eggs thereof, then introducing fresh air below the stack into the conditioned air, independently thoroughly mixing the fresh air and conditioned air, and causing the mixture to gently move up through the layers of eggs.

GEORGE T. MARKEY.